United States Patent [19]

Enari et al.

[11] Patent Number: 5,047,600
[45] Date of Patent: Sep. 10, 1991

[54] KNOB SWITCH DEVICE

[75] Inventors: Nobuyuki Enari; Hiroyasu Ito, both of Aichi, Japan

[73] Assignee: Kabushiki Kaisha Tokai Rika Denki Seisakusho, Aichi, Japan

[21] Appl. No.: 488,142

[22] Filed: Mar. 5, 1990

[30] Foreign Application Priority Data

Mar. 14, 1989 [JP] Japan .............................. 1-28678[U]

[51] Int. Cl.⁵ .......................... H01H 9/00; H01H 3/02
[52] U.S. Cl. ............................... 200/61.54; 200/61.27; 200/529
[58] Field of Search .............. 200/4, 5 R, 17 R, 61.27, 200/61.3, 61.34, 61.35, 61.54, 2, 529

[56] References Cited

U.S. PATENT DOCUMENTS

| 3,934,101 | 1/1976 | Jones | 200/61.27 X |
| 3,988,574 | 10/1976 | Peitsmeier | 200/61.27 |
| 4,144,424 | 3/1979 | Takeda et al. | 200/6 A X |
| 4,942,273 | 7/1990 | Furuhashi et al. | 200/61.54 |

Primary Examiner—J. R. Scott
Attorney, Agent, or Firm—Finnegan, Henderson, Farabow, Garrett, and Dunner

[57] ABSTRACT

The knob switch device comprises a body, an operation knob mounted on the body, which is rotatable and movable along an axial direction of the knob, first and second switches operated by the rotation and the movement of the knob, respectively, an inclined projection having an inclined surface which is inclined relative to the knob, which is provided in one of body and the knob, and a sliding contact member provided in the other one of the body and the knob, which is slidingly moved along and in contact with the inclined surface when the operation knob is depressed. Since the sliding contact member is slidingly moved down along the inclined surface when the operation knob is depressed, the operation knob is rotated together with the axial movement by the depression, thus operating two switches.

7 Claims, 3 Drawing Sheets

KNOB SWITCH DEVICE

BACKGROUND OF THE INVENTION

This invention relates to an improvement for a knob switch device in which an operating knob can be operatively rotated and depressed, and more particularly, to an improvement in a knob switch device in which rotation of the operating knob turns on one switch and in which axial depression of the operating knob turns on two switches in such a manner that the operating knob is automatically rotated during such axial depression.

In a conventional knob switch device for automotive wipers, for example, the device is provided at a distal end of a lever with an operating knob which is capable of rotating and axial movement. Rotation of the operating knob causes a wiper switch to be turned on to operate the wipers. The axial depressing of the operating knob causes a washer switch to be turned on to spray a washing liquid and, at the same time operate the wipers through a predetermined cycle.

The above-described device is arranged to operate only one switch by the depressing movement of the knob for energizing two motors i.e., a washer motor for spraying the washing liquid and a wiper motor. Therefore, when only the washer switch is turned on by depressing the knob, the wiper motor must be operated by using a special electrical circuit such that the wiper motor is operated for a predetermined period of time while the washer motor is operated. A problem with the conventional knob switch device arises out of the electrical circuit being complicated.

SUMMARY OF THE INVENTION

It is therefore an object of the present invention to provide a knob switch device in which two switches can be operated only by depressing an operating knob so as to control two kinds of operation i.e., two motors.

Another object of the present invention is to provide a knob switch device in which an electrical circuit for vehicles is made simple.

In order to attain the above-mentioned and other objects, a knob switch device according to the present invention comprises a body, an operating knob mounted on the body and being rotatable and movable axially along the rotational axis of the knob, first and second switches operated by the rotation and axial movement of the knob, respectively, an inclined guiding surface, which is inclined along the rotational direction of the knob, provided in one of the body and the knob, and a guided member provided in the other one of the body and the knob, which is slidingly moved along and in contact with the inclined guiding surface when the operating knob is depressed.

Since the guided member is slidingly moved down along the inclined guiding surface when the operation knob is depressed, the operation knob is rotated together with the axial movement in the direction it is depressed, thus operating two switches.

DETAILED DESCRIPTION OF THE PREFERRED EMBODIMENTS

An embodiment of the present invention is hereinafter described in detail with reference to the accompanying drawings.

Figure 6:
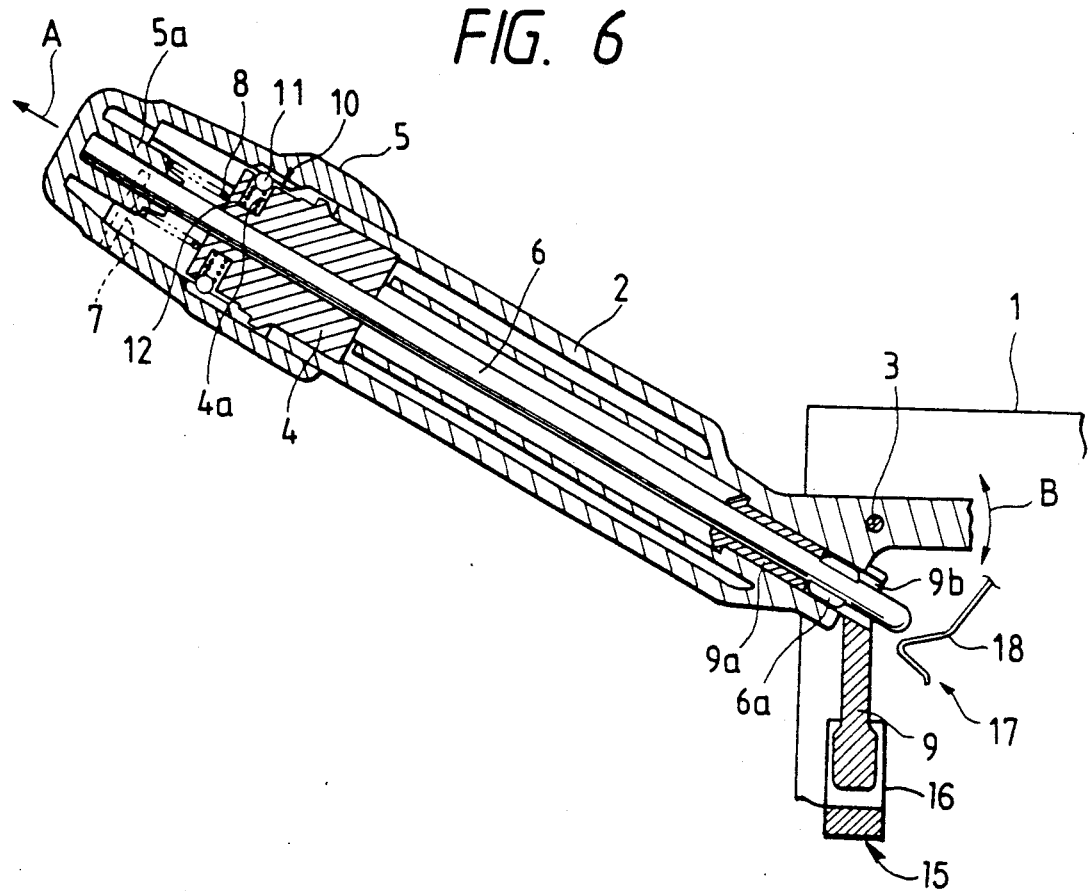
FIG. 6 is a cross sectional view entirely showing the embodiment.

As shown in FIG. 6, a base 1 is fixed to a column (not shown) through which a steering shaft of an automotive vehicle extends. A lever 2 is pivotably mounted on the base 1 by a shaft 3. A reception member 4 is fixed to the distal end of the lever 2. An operating knob 5 is arranged so as to surround the reception member. The operating knob 5 is rotatable around the reception member 4 and movable in an axial direction. A rod 6 extends through the lever 2 and is supported for rotation and axial movement relative to the reception member 4. A hollow cylindrical portion 5a of the operating knob 5 is connected to a distal end of the rod 6 by a pin 7. Therefore, the operating knob 5 is rotatable with the rod 6 around the reception member 4 and is movable therewith in the axial direction. A compression coil spring 8 is interposed between the reception member 4 and the operating knob 5 so as to bias the operating knob 4 to return in a direction indicated by an arrow A. A cylindrical bearing portion 9a of an arm 9 is rotatably supported to an inner surface of the proximal end of the lever 2. The rod 6 extends through the cylindrical bearing portion 9a. Projecting portions 6a, which are formed at the opposite end of the rod 6 from the end thereof connected with the operation knob 5, are slidingly engaged with grooves 9b formed in the bearing portion 9a. Since the projecting portions 6a are engaged with the grooves 9b, the arm 9 is rotated with the rod 6 when the rod 6 is rotated. Also, since the projecting portions are slidingly movable along the grooves 9b, the rod 6 is moved independently of the arm 9 in the axial direction. Further, the projecting portions 6a and grooves 9b limit the movement of the operating knob 5 by the compression coil spring 8 in the direction indicated by the arrow A, so that the portions 6a come into contact with inner end portions of the grooves 9b.

Figure 1:
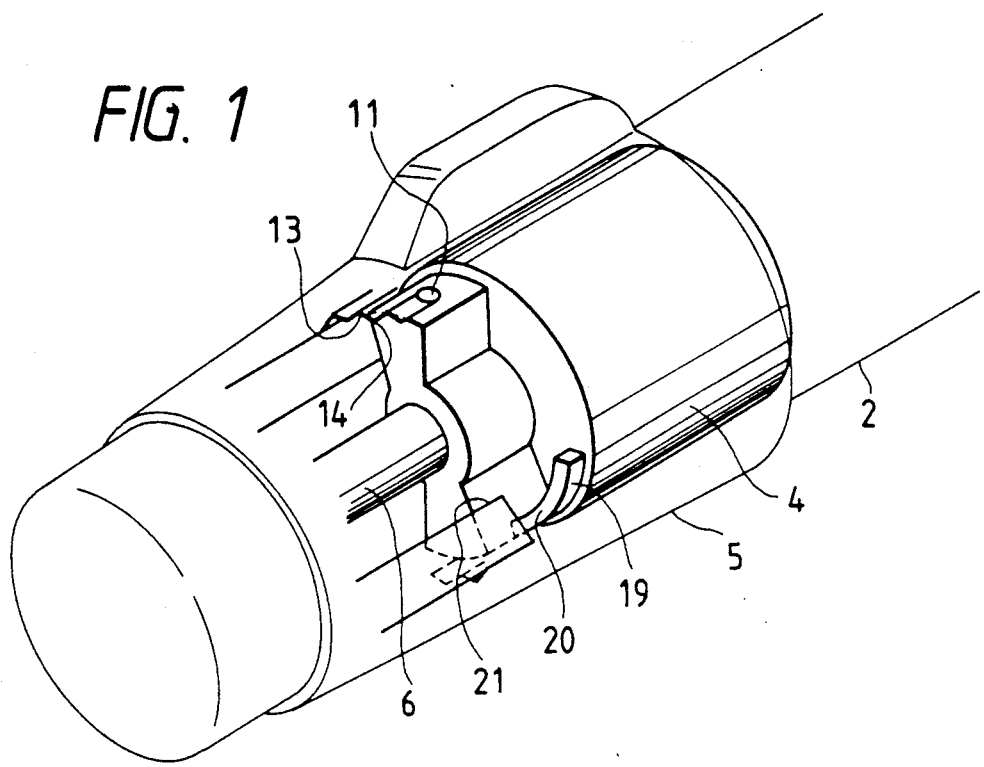
FIG. 1 is an enlarged perspective view showing a major part of an embodiment according to the present invention.

The reception member 4 is provided with cavities 4a. Each of the cavities has a ball 11 for a regulation or click mechanism 10. A compression coil spring 12 is used for biasing the ball 11 in contact with a circumferential inner surface of the operating knob 5. On the other hand, as shown in FIG. 1, a plurality of recess portions 13 and convex portions 14 are alternately formed on the circumferential inner surface of the knob 5. The ball 11 is biased against the inner surface of the knob 5 to be kept in contact with the surface, so that the ball 11 may be engaged with one of the recess portions 13, to thereby regulate the rotation of the operating knob 5 and to retain the position of the operating knob 5. Further, the operating knob 5 is provided with a first inclined guiding surface 5b for guiding the ball 11 from one of the recess portions 13 to an inner cylindrical surface 5c of the knob 5 when the knob 5 is depressed and moved in the direction opposed to the direction indicated by the arrow A. Therefore, the rotating regulation or click operation of the knob 5 is performed only when the knob 5 is rotated without depressing the knob 5.

Figure 4:
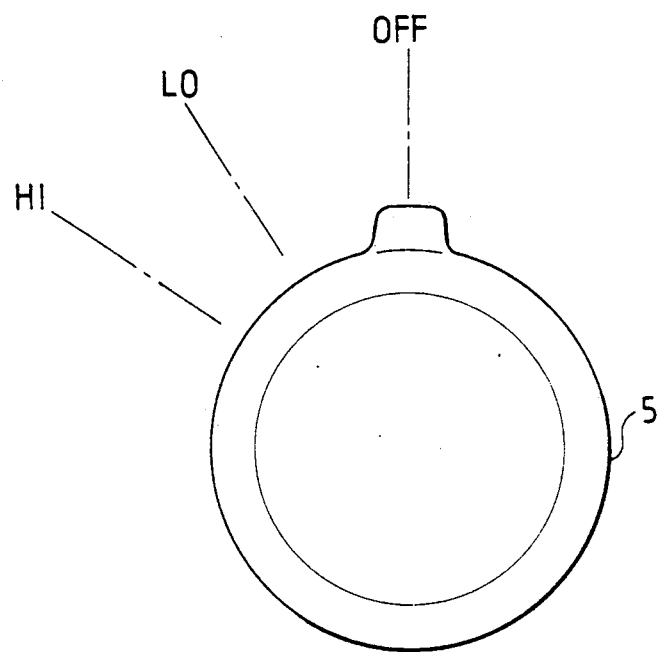
FIG. 4 is a front view showing an operating knob of the embodiment.
Figure 5:
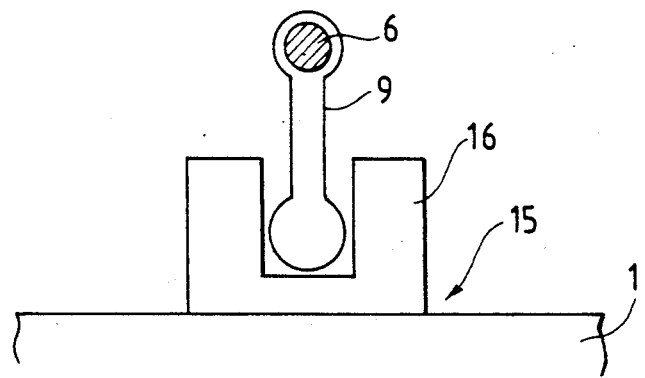
FIG. 5 is an enlarged schematic view showing a wiper switch portion of the embodiment.

If the operating knob 5 is rotated counterclockwise from an OFF position shown in FIG. 4, the rod 6 is rotated in the same direction to thereby rotate the arm 9, so that a contact holder 16 of a wiper switch 15 i.e., a first switch mounted on the base 1 is moved, as shown in FIG. 5. The joint position between the fixed contacts of the wiper switch 15 is changed by the movement of the contact holder 16. At an LO position shown in FIG. 4, the wiper motor is continuously rotated at a low speed. At an HI position also shown in FIG. 4, the wiper motor is continuously rotated at a high speed.

On the other hand, if the operating knob 5 is depressed to move the rod 6 in the direction opposed to the direction indicated by the arrow A, a movable contact 18 of a washer switch 17 i.e., a second switch mounted on the base 1 and shown in FIG. 6 is depressed, so that the movable contact 18 comes into contact with a fixed contact (not shown). As a result, a washer motor is driven to spray a washing liquid onto a window. In addition, if the lever is pivotably rotated around the axis 3 in the directions indicated by a double-headed arrow B, a turn signal switch (not shown) mounted on the base 1 is operated.

Figure 2:
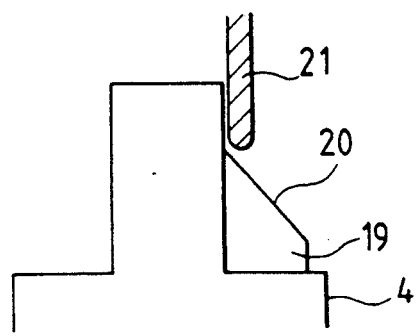
FIG. 2 is an enlarged side view showing another major part of the embodiment.
Figure 3:
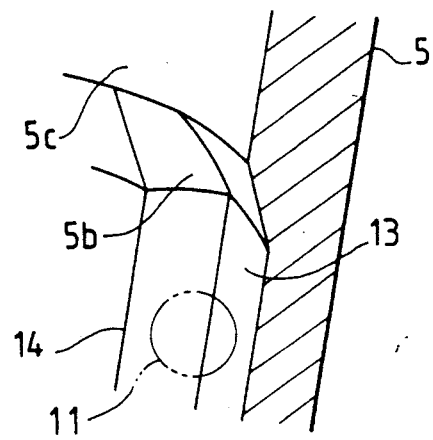
FIG. 3 is an enlarged perspective view showing a recess portion of a regulation mechanism of the embodiment.

As shown in FIGS. 1 and 2, the reception member 4 which is held stationary relative to the body is provided with a an axially projecting arcuate guiding rib 19 displaced from but generally concentric with the rotational axis of the operating knob 5. The guiding rib 19 is of gradually reduced height between the ends thereof proceeding in a counterclockwise direction as shown in FIG. 1, for example, to form a second inclined guiding surface 20. The operating knob 5 is provided at its inner surface with a guided member 21, which is in the form of a projection, and which slidingly engages the second inclined guiding surface 20 when the operation knob 5 is depressed. The guiding surface 20 and the guided member 21, therefore, serve as a cam surface or ramp and a follower, respectively. Additionally, if the operating knob 5 is depressed at the OFF position, the guided member 21 comes into contact with second inclined guiding surface 20 initially at the high end portion of the arcuate rib projection 19.

The operation of the above-described embodiment is hereinafter described.

If the operating knob 5 is depressed against the compression spring 8, in the direction opposite to that indicated by the arrow A, in an angular position at which the operating knob 5 is held at the OFF position, the ball 11 biased against one of the recess portions 13 is slidingly moved from one of the portions 13 to the cylindrical surface 5c. After that, the guided member 21 comes into contact with the second inclined surface 20 of the reception member 4. Continued depressions of the operating knob 5 results in the second surface 20 applying a force onto the guided member 21. As the guided member 21 slides down along the second surface 20 the operating knob 5 is rotated counterclockwise during axial movement to bring the operating knob 5 to the position LO at the time when the operating knob 5 is depressed to the utmost limit. Because the ball 11 is in the cylindrical surface 5c where the recess portions 13 and convex portions 14 are not formed during the time the guided member 21 is in engagement with the second surface 20, the operating knob 5 is freely rotated without a regulation or click stop force applied by those portions. Moreover, the rotation of the operating knob 5 by the guided member 21 and the second inclined guiding surface 20 causes the wiper switch 14 to be turned on, thus activating the wiper motor. At the same time, movement of the rod 6 by full depression of the knob 5 causes the washer switch to be turned on, thus activating the washer motor to spray a washing liquid. After that, the depressing force applied onto the operation knob 5 is released, so that the knob 5 is slidingly moved by a biasing force of the compression coil spring 8 back to the return position in a state that the knob 5 is LO position. Finally, the knob 5 is manually rotated clockwise to the OFF position so as to stop the wipers.

As described above, the knob switch device according to an embodiment of the present invention is arranged to operate both the wiper switch and the washer switch by only the depressing movement of the operating knob 5. Since the device of the present invention differs from the conventional knob switch which operates the wiper switch only in this condition, it is unnecessary to provide a special electrical circuit to operate the wiper motor as when the washer switch activates both the washer motor and the wiper motor. Also, it is unnecessary to perform the two manual operations, that is, the depressing operation of the knob 5 to activate the washer and the manual rotating operation thereof to activate the wiper motor after the depression. Therefore, the activation of the washer and the wiper by the operating knob is facilitated.

Figure 7:
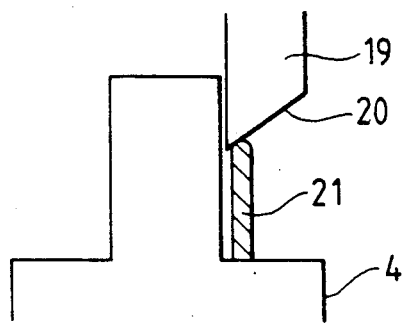
FIG. 7 is an enlarged side view showing a major part of another embodiment.

Additionally, in the above-described embodiment, the second inclined guiding surface 20 is provided in the lever 2 and a guided member 21 in the operating knob 5, however, it is possible to provide an operating knob 5 with the second surface 20 and the lever 2 with the guided member 21 as shown in FIG. 7.

It is apparent that the device of the present invention is not limited to be used for vehicles, but is broadly and generally used as a knob switch device.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A knob switch device having a body, an operating knob mounted on said body to be rotatable about and axially movable along a rotational axis of said operating knob, a first switch operated by rotation of said operating knob, and a second switch operated by axial movement of said operating knob, said device comprising:
    a guiding member on one of said body and said operating knob, said guiding member having an inclined surface to provide a ramp sloping at an angle with respect to the direction of axial movement of said knob,
    a guided member on the other of said operating knob and said body, said guided member being in contact with said inclined surface so that when said operating knob is depressed to move in the axial direction to operate said second switch, said operating knob also rotates to operate said first switch.

2. The device according to claim 1, wherein said body includes a reception member fixed to one end of said body, said reception member including said guiding member.

3. The device according to claim 2, wherein said operating knob includes an inner surface lying outside of said reception member and wherein said guiding member comprises a projection extending axially from said reception member along said inner surface of said operating knob, said projection being of gradually reduced height toward one end thereof to form said inclined surface.

4. The device according to claim 2, wherein said operating knob includes an inner surface lying outside of said reception member, said device further comprising:
   a click stop mechanism for regulating the rotation of said operating knob, said mechanism including at least one cavity in said reception member, a ball disposed in said cavity, a compression coil spring biasing said ball against the inner surface of said operating knob, and a plurality of recess portions on the inner surface of said operating knob whereby one of said recess portions is engaged by said ball.

5. The device according to claim 4, wherein said click stop mechanism further includes:
   an inclined portion extending from each of said recess portions to a cylindrical portion of said inner surface of said operating knob, said ball following said inclined portion from one of said recess portions upon axial depression of said operating knob to lie against said cylindrical portion to enable free rotation of said operating knob upon such axial depression thereof.

6. The device according to claim 1 in which said guiding member is provided on said operating knob and said guided member is provided on said body.

7. The device according to claim 1 in which said guiding member is provided on said body and said guided member is provided on said operating knob.

* * * * *